United States Patent [19]

Zawodny et al.

[11] Patent Number: 5,689,733
[45] Date of Patent: Nov. 18, 1997

[54] FILM LOADING METHOD FOR A SINGLE USE APS CAMERA

[75] Inventors: Arthur Zawodny, Tsing Yi Island; Bill Yung Wai Lam, Nam Tin; Eli Shoer, Wanchai; Franco Yik Kai Chung, Hong Kong, all of Hong Kong

[73] Assignee: Concord Camera Corp., Avenel, N.J.

[21] Appl. No.: 713,780

[22] Filed: Sep. 13, 1996

[51] Int. Cl.[6] .................................................. G03B 17/02
[52] U.S. Cl. ........................................ 396/6; 396/538
[58] Field of Search .............................. 396/6, 411, 415, 396/535, 536, 538, 513

[56] References Cited

U.S. PATENT DOCUMENTS

| | | | |
|---|---|---|---|
| 2,674,931 | 4/1954 | Mihalyi | 95/31 |
| 2,989,906 | 6/1961 | Rentschler | 95/11 |
| 3,096,699 | 7/1963 | Harvey et al. | 95/31 |
| 3,282,181 | 11/1966 | Lange | 95/11 |
| 3,481,261 | 12/1969 | Fischer et al. | 95/31 |
| 4,332,448 | 6/1982 | Zawodny | 354/213 |
| 4,455,074 | 6/1984 | Wong et al. | 354/173.1 |
| 4,685,790 | 8/1987 | Uematsu | 354/203 |
| 4,804,987 | 2/1989 | Arai | 354/219 |
| 4,855,774 | 8/1989 | Ohmura et al. | 354/203 |
| 4,954,857 | 9/1990 | Mochida et al. | 396/6 |
| 4,972,649 | 11/1990 | Mochida et al. | 53/430 |
| 5,000,396 | 3/1991 | Barrella | 242/71 |
| 5,063,400 | 11/1991 | Takei et al. | 354/288 |
| 5,394,214 | 2/1995 | Petruchik | 354/288 |
| 5,452,036 | 9/1995 | Kamata | 354/275 |
| 5,453,808 | 9/1995 | Zawodny et al. | 354/212 |
| 5,600,395 | 2/1997 | Balling et al. | 396/6 |

FOREIGN PATENT DOCUMENTS

| | | |
|---|---|---|
| 949324 | 9/1956 | Germany . |
| 48-46622 | 10/1971 | Japan . |
| 2130387 | 5/1984 | United Kingdom . |

*Primary Examiner*—Howard B. Blankenship
*Attorney, Agent, or Firm*—Woodcock Washburn Kurtz Mackiewicz & Norris LLP

[57] ABSTRACT

A method of loading film into a camera that employs a film cassette with a light lock door and has a back cover securely affixed to a main body includes loading the film cassette into a film cassette compartment via a film loading port with the light lock door closed, operating an advancing means to engage a light lock door driver affixed to the camera, rotating the advancing means to open the light lock door with the light lock door driver, preventing further rotation of the advancing means from operating the light lock door driver; continuing to rotate the advancing means to drive film out of the cassette across the film path and into a film receiving slot contained in a film spool and winding film from the cassette onto the spool. Additionally, a camera includes a mechanism for opening and closing a light lock door of a film safe cassette and the mechanism for opening and closing the light lock door. The method described above may also include loading film and/or operating the light lock door of the film safe cassette while at least a potion of the film path is exposed to light.

9 Claims, 9 Drawing Sheets

FILM LOADING METHOD FOR A SINGLE USE APS CAMERA

FIELD OF THE INVENTION

This invention relates generally to a method of loading film into an APS camera, and particularly into a so-called "single use" APS camera. The invention also relates to an APS camera that employs such a method.

BACKGROUND OF THE INVENTION

Recently, a new type of film cassette has been developed, sometimes called a film safe cassette, which has a light lock door and does not, at the time of purchase, or at the time that the film is first inserted into the camera, have a film leader extending from the cassette to facilitate film loading. One example of film employing such a cassette is KODAK® brand ADVANTIX® film. The cameras with which these film cassettes are used are known as Advanced Photo System, or APS, cameras. Conventional film cartridges, such as 35 mm film cartridges, have a film leader extending therefrom at the time of purchase, and a brush or similar mechanism at the cartridge's film slot to prevent light from entering the cartridge and exposing film contained therein. In contrast, a film safe cassette does not have a brush or similar mechanism but instead has a light lock door that is automatically opened by the camera after the film has been loaded. Film is loaded into and removed from the camera via a film cassette door disposed on the bottom of the camera. The camera then drives the film out of the cassette and into a film spooling area on the opposite side of the camera from the cassette. Before the cassette can be removed from the camera, the camera rewinds the film back into the cassette, and then closes the light lock door. If the light lock door were permitted to be opened in the presence of light, the film inside the cassette would be exposed. Thus, the light lock door operating in conjunction with the camera ensures that film is not inadvertently exposed.

In a conventional camera, such as a conventional 35 mm camera, film is loaded from the back of the camera by opening a back door thereof, dropping the cartridge into the camera, pulling the film leader across the camera, engaging the leader on a take-up spool, then closing the back door. Since opening the light lock door in the presence of light can expose the film in a film safe cassette, conventional methods of loading film cartridges are not suited to loading film safe cassettes into APS cameras. Moreover, because at least re-usable APS cameras employ a small cassette door on the bottom of the camera to load and unload the film cassette, there is no back cover or back door that can be easily opened to practice a conventional loading technique.

So called single use cameras are known in the art. A single use camera is one that is manufactured and sold with the intent of being used only a single time (i.e., with only roll of pre-loaded film) by the purchaser or end user. Single use cameras are usually made of plastic. Film is pre-loaded into the camera during manufacturing, and the camera is sealed closed. This is done by loading the film into the back of the camera in much the same way as a conventional 35 mm camera is loaded, then securely assembling a back cover to the camera by a locking mechanism, screws, adhesives, thermal bonding, etc. Typically, a package (such as paper, cardboard or even plastic) is placed around the camera body so that the film cannot be removed without destroying at least part of the package, and in some cases, without destroying part of the camera body as well. Additionally, film cannot be easily reloaded into the sealed camera, at least not without partial destruction of the camera body or its packaging.

Single use APS cameras are also known in the art. It will be appreciated that loading a film safe cassette into a single use APS camera presents special problems. The light lock door cannot be opened without exposing the film in the cassette, so film loading and final camera assembly must take place in a darkroom. This assembly involves performing the following steps in darkroom conditions: opening the light lock door with a tool or fixture, externally of the camera; either manually with a tool or with a fixture external to the camera driving film from the cassette by rotating the spool inside the cassette; either manually or with a fixture external to the camera spooling unexposed film into a film spool area of the camera and loading the film cassette from the back of the camera (i.e., with the back cover removed); then, assembling the back cover to the camera. If the camera requires a battery, then depending on the construction of the camera, the battery may have to be loaded in darkroom conditions. Thus, loading film into a single use APS camera is cumbersome, time consuming, and labor intensive.

Usually, in a single use camera, all of the film is pre-wound into the film spool area (sometimes called "pre-loading"), and, during picture taking, film is withdrawn back into the cassette, one frame at a time. Single use APS cameras usually automatically close the light lock door on the film cassette after all of the film has been rewound back into the cassette. This is usually done by means of a film sensor or other mechanism.

No known single use APS camera has any built-in mechanism for opening the light lock door after the film cassette has been loaded into the camera, much less doing so with the back cover in place on the camera, and thus known single use APS cameras are not presently amenable to a film loading process that can occur in non-darkroom conditions.

It is desirable to provide a method for loading a single use APS camera that is simple and relatively labor free, and that does not require loading in darkroom conditions. It is also desirable to provide a single use APS camera that employs such a method for film loading. The present invention achieves these and other goals.

SUMMARY OF THE INVENTION

According to the present invention, there is provided: a method of pre-loading an APS camera with film from a film safe cassette in non-darkroom conditions, and a camera that employs such a method; a single use, non-motorized, APS camera that is capable of both opening and closing the light lock door of the film safe cassette; an APS camera that operates the light lock door by means of the camera's film advance mechanism; a method of loading an APS camera with film in non-darkroom conditions while at least a portion of film disposed in the film path is exposed to light, and while the light lock door is opened, and an APS camera that employs such a method; and, a method of loading an APS camera with film and a battery.

An APS camera according to the invention has a main body and a back cover securely affixed thereto. A film cassette compartment is disposed on one end, and a rotatable spool is disposed in a film spool compartment on the other end. A film receiving slot is disposed in the spool, and a film path extends from the film cassette compartment to the film spool compartment. The camera is constructed such that, during a film loading process, the only path for meaningful amounts of light to enter the camera is via the film receiving slot and into the film path, but the film path is designed so that meaningful amounts of light cannot travel far enough there along toward the film cassette to expose film inside a cassette whose light lock door has been opened to permit feeding of film for the film loading operation. Depending on the design of the film path, the level of ambient light that can enter the film path without exposing the film inside of the cassette will vary. Preferably, the ambient light level in the assembly room during a film loading procedure is such that it allows for comfortable working conditions, but the assembly room need not be a dark room. For instance, the light level could be such that an assembler could read normal sized typed print or even fine print.

A method of loading film from a film safe cassette into such a camera comprises loading the film into the camera in non-darkroom conditions, such that light can enter at least a portion of the film path via the slot in the spool. The light lock door is opened (in the camera by means described below) and film is advanced from the film cassette toward the spool; the spool is oriented so that the slot therein is aligned with the path of travel of the film, and so that the advancement of the film causes a leading edge of the film to be received into the slot. The spool is then rotated (preferably, by external drive means) so that film is wound there around, thus blocking the light path through the slot and preventing any further light from entering the film path. Preferably, the spool is rotated sufficiently such that all frames of the non-exposed film are withdrawn from the film cassette and wound around the spool, i.e., the film is pre-wound on the spool and the camera is pre-loaded. During picture taking, film is withdrawn back into the film cassette, one frame at a time, as each frame is exposed. In an alternative embodiment, a spool driver is light tightedly inserted into the film spool before the light lock door is opened, so as to prevent light from entering the film path.

A preferred embodiment of the camera further comprises a manual film advancing means, such as a thumb wheel and associated drive components, for advancing the film as above described, and for withdrawing or rewinding the film back into the cassette. According to one feature of the invention, the advancing means is coupled to a light lock door driver that performs the functions of both opening and closing the light lock door. The light lock door driver engages a light lock door actuator inside the film cassette and is responsive to rotation of the advancing means in one direction to open the light lock door, and is responsive to rotation of the advancing means in the other direction to close the light lock door when a film detection mechanism (sensor) detects that all film has been rewound. According to the film loading method of the present invention, a film cassette is loaded into the camera with the light lock door closed, through a cassette film loading door or port in the bottom of the camera, as is common. The advancing means is rotated in a first direction (e.g., by rotating the thumb wheel in a first direction) to cause the light lock door driver to open the light lock door; then, the light lock door driver is de-coupled from the advancing means so that further rotation thereof in the first direction is not impeded by the engagement of the light lock door driver with the light lock door actuator inside the cassette. The advancing means is continued to be rotated in the first direction, causing film to advance out of the film cassette, into the camera, and into the film slot in the spool, as above described. The spool is rotated as above described to pre-wind the film on the spool and pre-load the camera. The camera is now ready for picture taking.

After the camera has been pre-loaded, a preventer engages the advancing means and prevents any further rotation in the first direction. Now, the advancing means can be rotated only in a second direction that is opposite to the first direction. During picture taking, the advancing means is rotated in the second direction to rewind the film back into the film cassette, one frame at a time, as is common. The film detection mechanism detects when all of the film has been rewound, and in response thereto, allows the light lock door driver to become re-coupled to the advancing means. Further rotation of the advancing means in the second direction causes the light lock door driver to close the light lock door, whereby the film cassette is ready to be removed for processing.

According to one aspect of the invention that employs a battery, the film loading process is facilitated by the manner in which the battery is loaded into the camera. Preferably, the camera of the present invention is provided with a battery compartment inside of the film spool as more fully described in co-pending, commonly assigned U.S. patent application Ser. No. 08/712,928, filed Sep. 13, 1996, entitled "Camera With Battery Located Inside of the Film Spool". According to the present invention, a final step of pre-loading the camera involves inserting the battery inside the film spool via the same opening that is employed to externally pre-wind the film (after the film has been pre-wound there around), then closing the opening by means of a tab or door placed there over.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT

Referring now to the drawings, wherein like reference numerals designate corresponding structure throughout the views, there is shown a preferred embodiment of an APS camera 10 according to the present invention, and a method for loading film into the same in non-darkroom conditions. According to the preferred embodiment, the camera 10 is a single use APS camera, as more fully described herein, but certain aspects of the invention are not limited to single use cameras, and the scope of the invention is not limited thereto, except as expressly noted in the following specification and claims.

Figure 1:
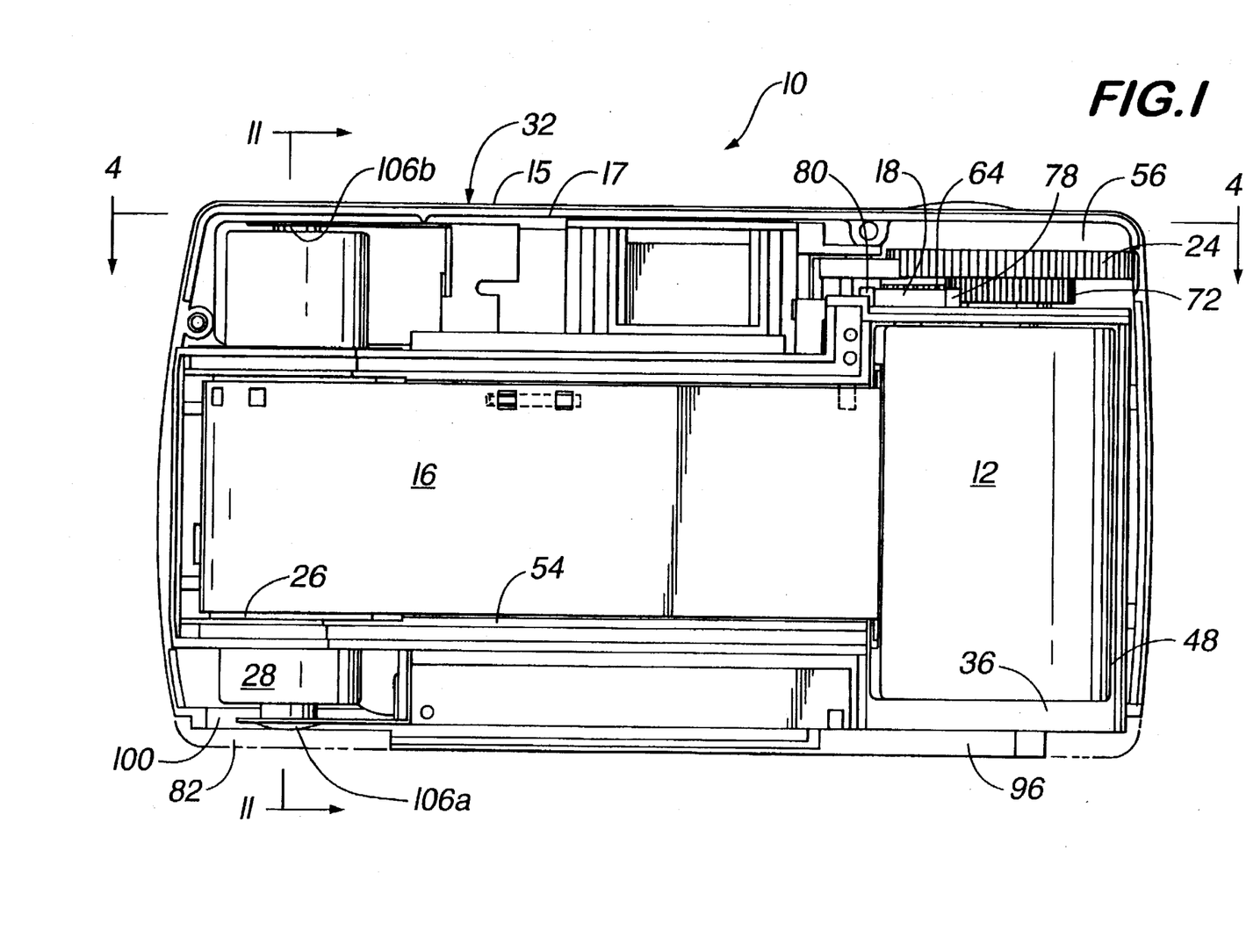
FIG. 1 is a rear plan view of a single use APS camera with its back cover removed, according to the present invention.
Figure 12:
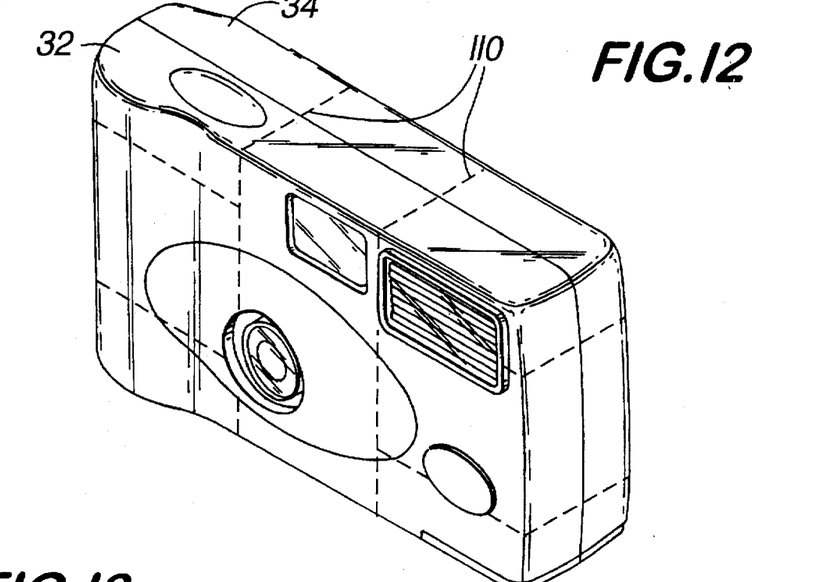
FIG. 12 is a front perspective view showing certain external features of one embodiment of the camera of FIG. 1.
Figure 13:
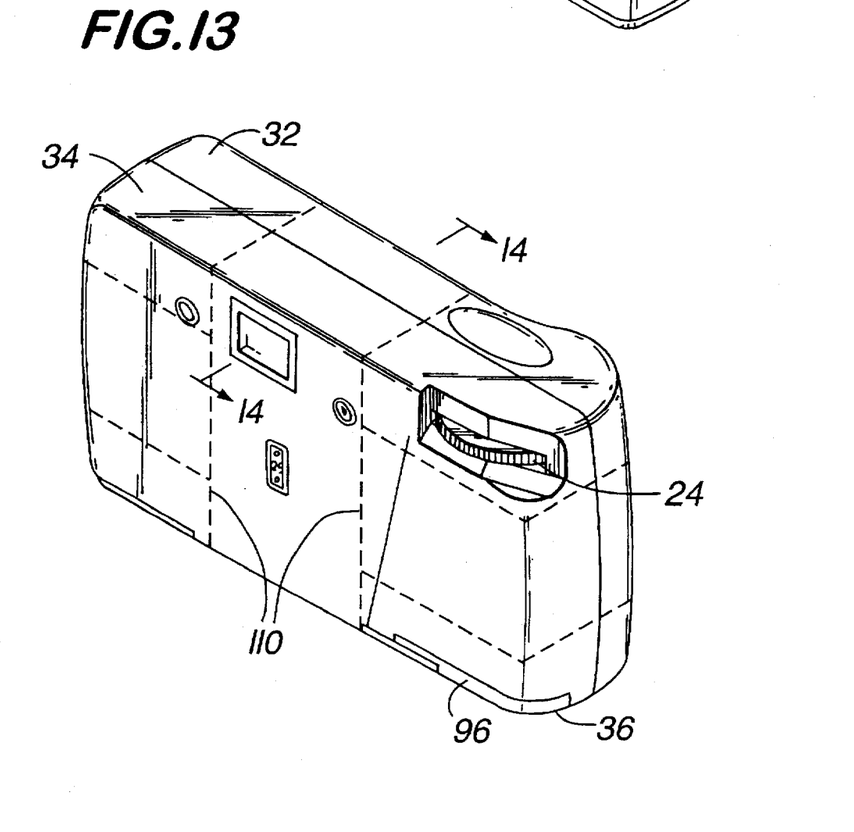
FIG. 13 is a rear perspective view showing certain external features of one embodiment of the camera of FIG. 1.

Referring particularly to FIGS. 1, 12 and 13, and also to FIGS. 2, 4, 9 and 10, camera 10 includes a main body 32 having a film cassette compartment 48, a film spool 26, a back cover 34, a film advancing means 56 mounted within the main body 32 for advancing film 16 from the film cassette 12 to the film spool 26 and from the film spool 26 to the film cassette 12, and a film cassette light lock door driver 18 for operating a film cassette light lock door 14 driven by the advancing means 56.

Figure 8:
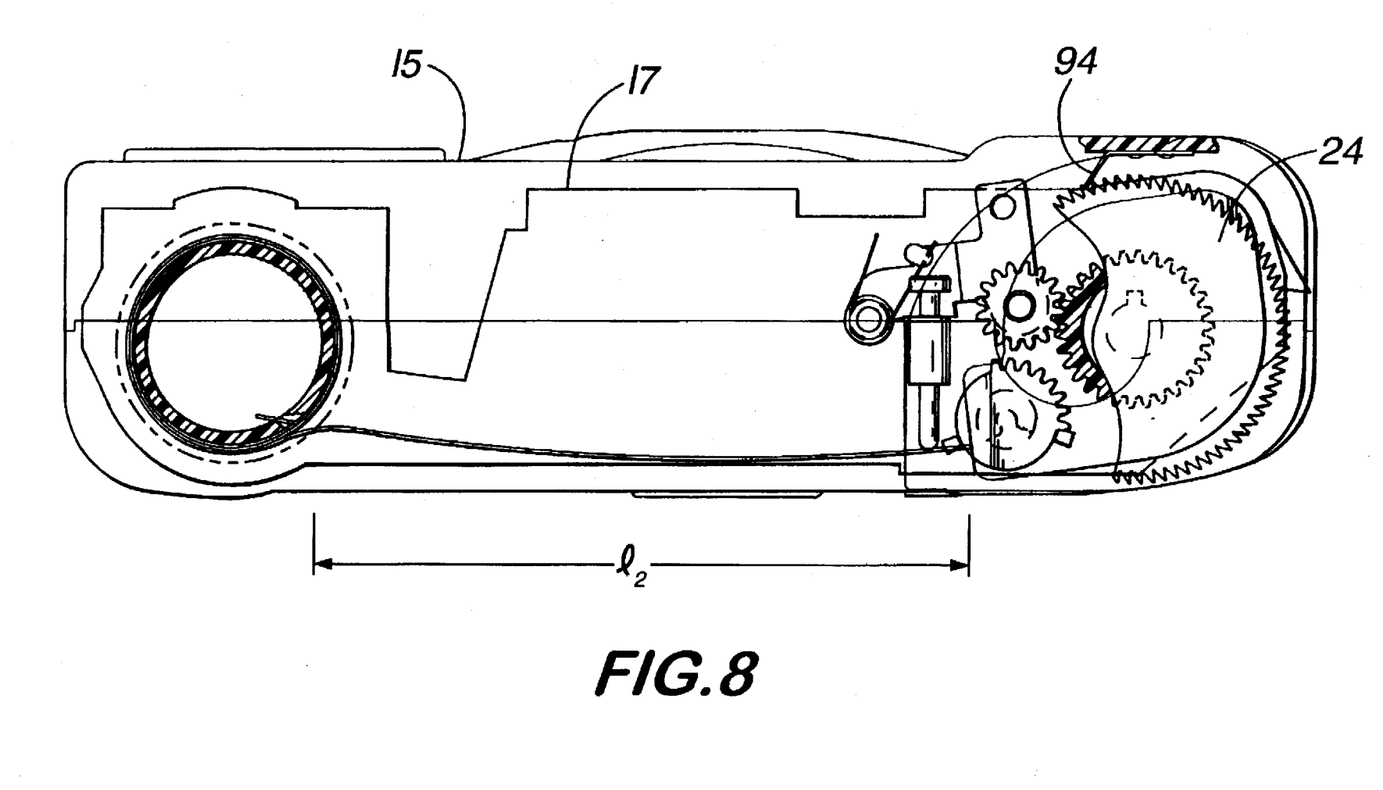
FIG. 8 is a cross section taken through line 4—4 and illustrates the preventer engaged with the advancing means so as to prevent rotation of the advancing means in the first direction, as above described.
Figure 9:
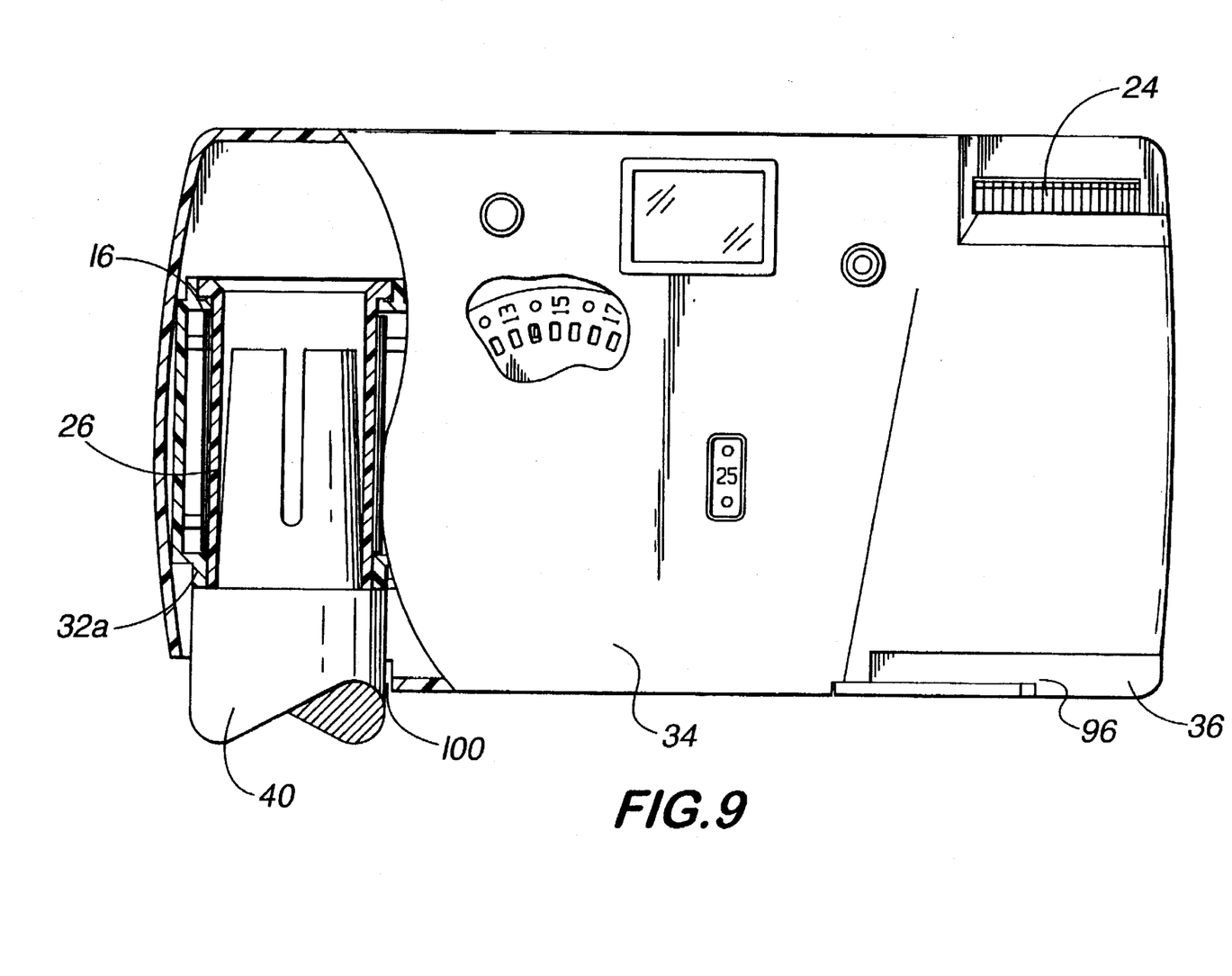
FIG. 9 is a partial cut away rear plan view of the camera of FIG. 1 and illustrates the film spool.

In the illustrated embodiment of the camera 10 shown in FIGS. 1 and 8, the main body 32 also includes a front 15, or a front cover 15, of the camera 10. However, the term "main body," as used herein and in the appended claims, is not intended to be so limited. Except as otherwise noted, or as shown in the drawings, or except as the context and usage may indicate, the term "main body" is intended to mean both: (i) an inner body 17 of the camera 10, as herein described, with an integral front 15, or with the front cover 15 attached; and (ii) only the inner body 17 of the camera 10. Moreover, it is preferred that the embodiment of the camera disclosed herein, including the front cover 15, back cover 34 and main body 32 be manufactured from a molded plastic.

Figure 4:
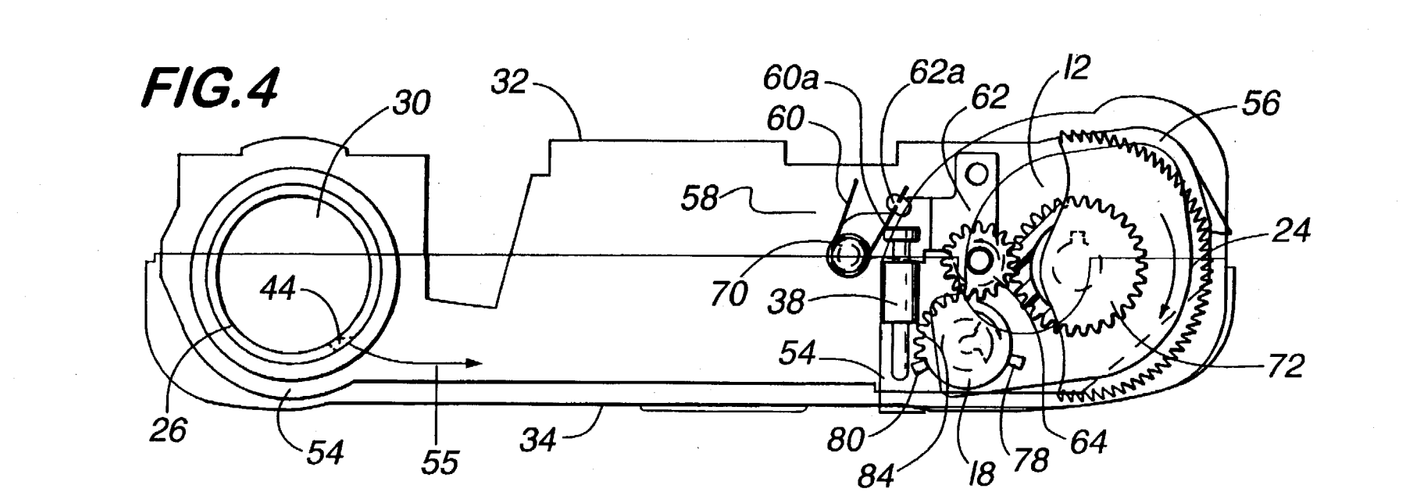
FIG. 4 is a cross section taken through line 4—4 of FIG. 1 and illustrates the position of the light lock door driver when a film cassette is first loaded, and also after the driver has been operated to close the light lock door.
Figure 5:
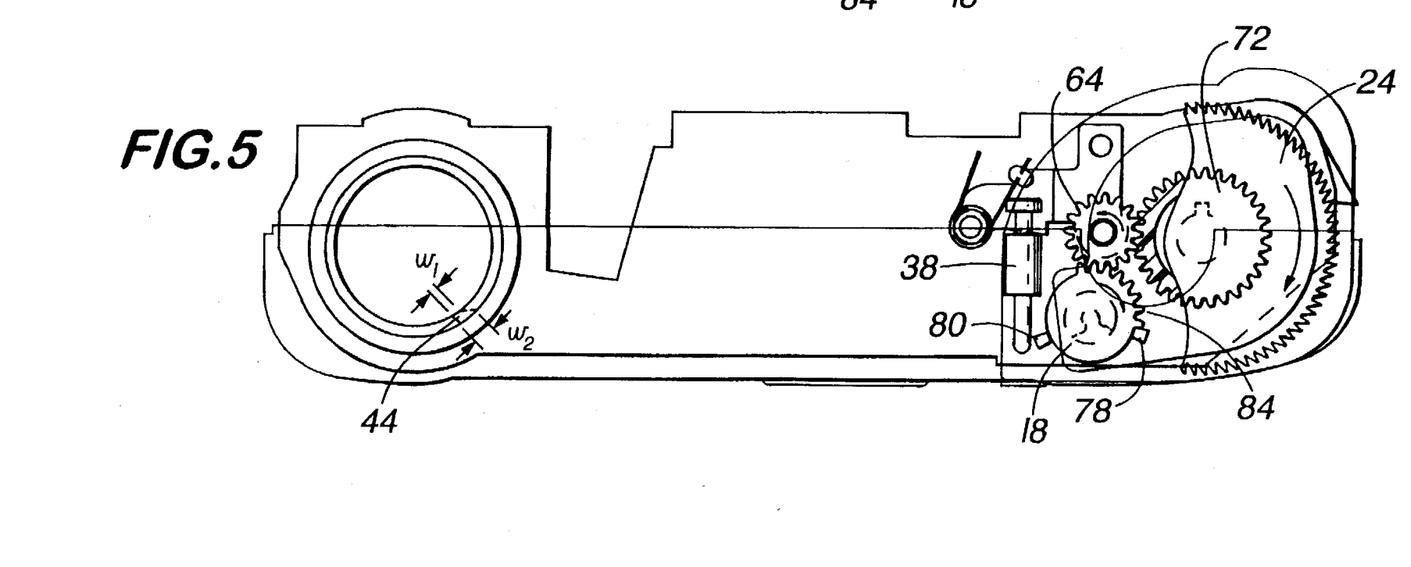
FIG. 5 is a cross section taken through line 4—4 of FIG. 1 and illustrates the position of the light lock door driver after it has been operated to open the light lock door.
Figure 6:
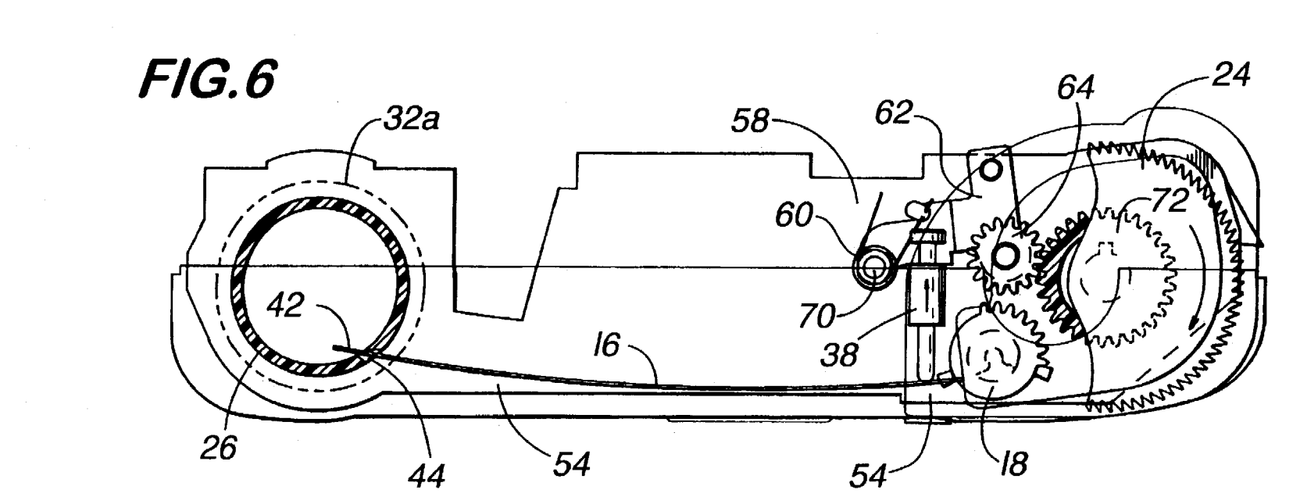
FIG. 6 is a cross section taken through line 4—4 of FIG. 1 and illustrates the advancing means in a disengaged status from the light lock door driver.
Figure 7:
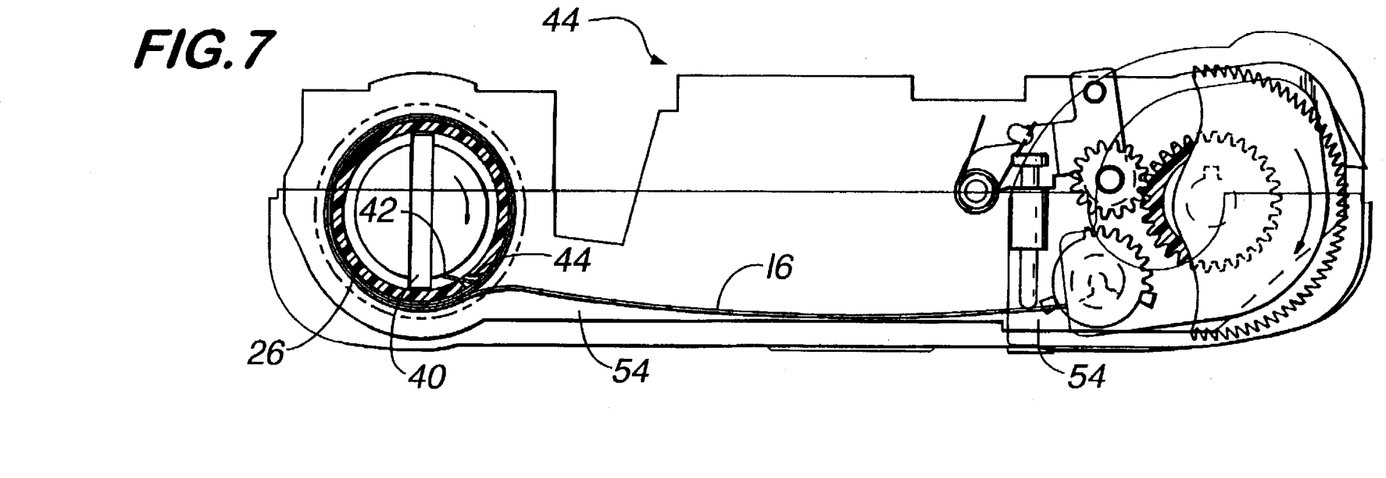
FIG. 7 is a cross section taken through line 4—4 of FIG. 1 and illustrates film pre-loaded into the camera.

The film spool 26 preferably has a film receiving slot 44. The film receiving slot 44 receives an edge 42 of the film 16 when the film 16 is transferred from the film cassette 12 to the film spool 26. FIGS. 4 and 5 depict the slot 44 prior to film 16 being transferred to the film spool 26. FIG. 6 illustrates the film 16 being transferred from the film cassette 12 and being inserted into the slot 44. FIG. 7 illustrates the film 16 wound around the film spool 26 with the edge 42 of the film 16 in the slot 44.

Figures 2, 3:
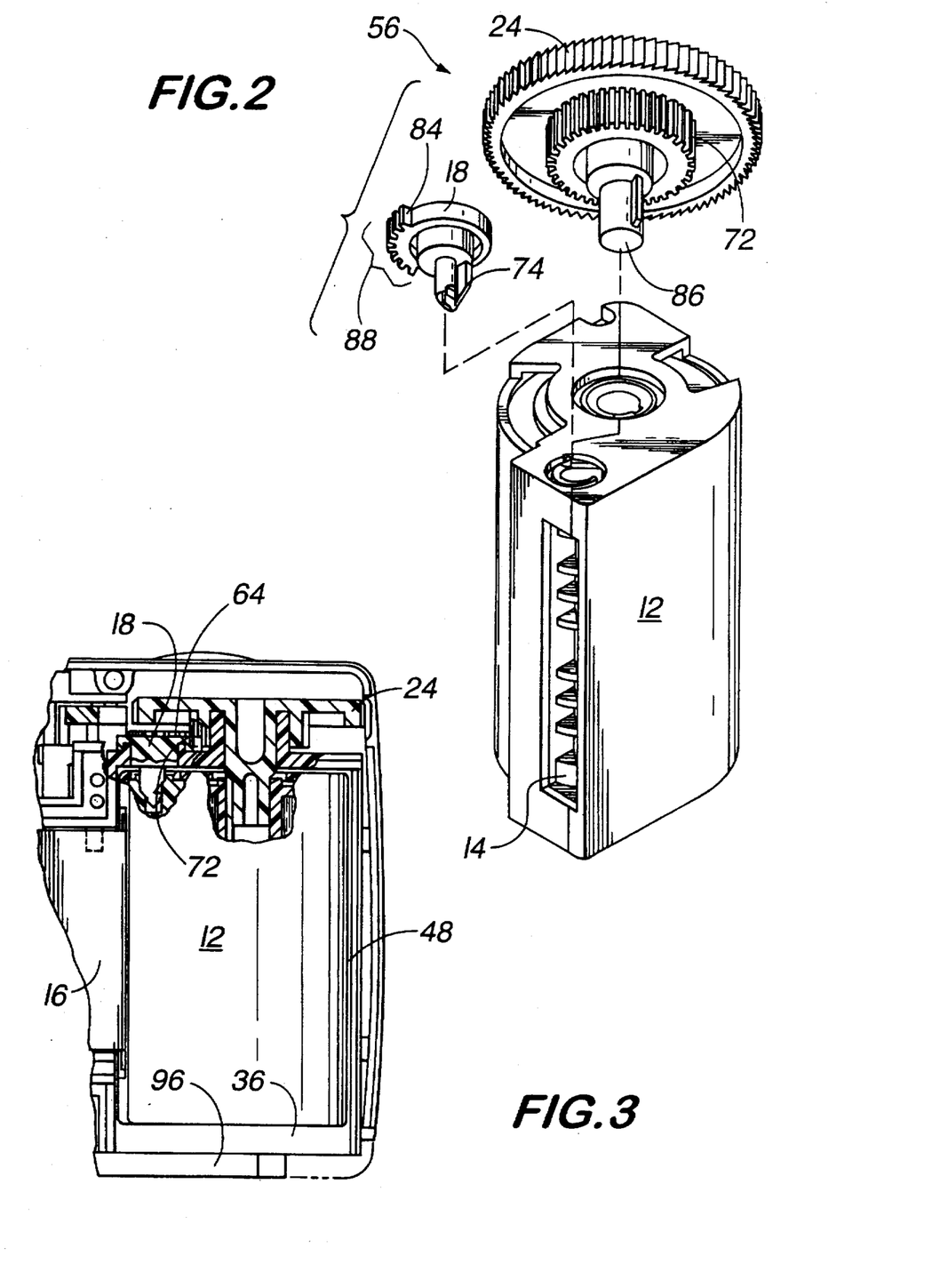
FIG. 2 is an isometric view illustrating the cooperation among the film safe cassette employed in the camera of FIG. 1, a portion of the film advancing means therefor, and the light lock door driver.
FIG. 3 is a partial cut-away view of the rightmost portion of FIG. 1.

The advancing means 56 is depicted in FIGS. 2-7 and is rotatably mounted within the main body 32. The advancing means 56 includes a manual advance wheel preferably in the form of a thumb wheel, a driving gear 72 and a shaft 86 for engaging the internal spool of the film cassette 12. As is clearly shown in FIGS. 2 and 3, since the advance wheel 24 is common with the driving gear 72 and the shaft 86, rotation of the advance wheel 24 will cause rotation of the driving gear 72 and the shaft 86. The shaft 86 mates with the film cassette 12 so that rotation of the advance wheel 24 will cause film 16 to be driven out of and withdrawn into the cassette 12 when the light lock door 14 is open. Also illustrated in FIGS. 2-7 is the light lock door driver 18. The light lock door driver 18 contains a segmented portion 88 which has teeth 84 there around. As shown in FIGS. 4-7, the light lock door driver 18 is rotatably mounted within the main body 32. The light lock door driver 18 has a shaft 74 (FIG. 2) that mates with an internal actuator in the cassette 12 so that rotation of the light lock door driver 18 operates the light lock door 14 to either an open or closed position. FIGS. 2 and 3 best illustrate the mating of the light lock door driver 18 with the cassette 12.

As shown best in FIGS. 4-8, the light lock door driver 18 is operatively engageable and disengageable with the advancing means 56. When the advancing means 56 is coupled to (engaged with) the driver 18 (FIGS. 4 and 5), rotation of the advancing means 56 will cause rotation of the light lock door driver 18. Rotation of the light lock door driver 18 causes the light lock door 14 to change from an open position to a closed position, or from a closed position to an open position, as will become more apparent hereinafter.

Camera 10 also includes an actuating mechanism 58 for coupling and decoupling the advancing means 56 to and from the driver 18. As shown in FIGS. 4-8, the actuating mechanism 58 includes a film sensor 38, a spring 60, a pivotable lever 62, and a coupling gear 64. The lever 62 is pivotally mounted within the main body 32 on a pin 70; spring 60 is also mounted on pin 70. The sensor 38 and the coupling gear 64 are mounted to the lever 62 as shown, and spring 60 has an arm 60a that urges against a post 62a on the lever 62. As is shown in FIGS. 4-8, the lever 62 and the attached sensor 38 are biased by the spring 60 towards the back cover 34. The sensor 38 is urged against film 16 when film is present. It will be noted that the sensor 38 is located immediately adjacent to the location where the light lock door 14 resides when a film cartridge 12 is present in the camera. As will become apparent, this permits the sensor to detect when all of the film has been rewound. As best seen in FIGS. 4-8, the coupling gear 64 couples the advancing means 56 (via the driving gear 72) to the driver 18 (via segmented portion 88) when lever 62 is in a first position (FIGS. 4 and 5), and decouples the advancing means 56 from the driver 18 when lever 62 is in a second position (FIGS. 6-8). As will become apparent hereinafter, the lever 62 is in the first position when no film 16 is in the film path 54, and is in the second position either (i) during a film loading procedure, or (ii) when film is present in the film path 54.

FIG. 4 shows the coupling gear 64 engaged with the driving gear 72 and the light lock door driver 18. Rotation of the advance wheel 24 rotates driving gear 72. With the coupling gear 64 engaged as shown in FIG. 4, rotation of the advance wheel 24 in a clockwise direction causes rotation of the coupling gear 64 in a counterclockwise direction, which in turn, causes rotation of the light lock door driver 18 in a clockwise direction, as indicated by the arrows on each of the elements 24, 64 and 18 in FIG. 4. Since shaft 74 engages the film cassette's internal light lock door actuator, the clockwise rotation of the light lock door driver 18 is operative to open the light lock door 14. FIG. 5 illustrates the position of the light lock door driver 18 after it has been driven by the advancing means to open the light lock door 14. Note that the sensor 38 projects into the film path 54 along which film 16 will travel when ejected from the cassette 12.

FIG. 6 depicts the lever 62 in a retracted position. Lever 62 is retracted either manually, or by means of a fixture (not shown), after the light lock door 14 has been opened as above described. While lever 62 is being retracted, it pivots about pin 70; retraction of the lever 62 de-couples coupling gear 62 from light lock door driver 18, as shown. Thus, further rotation of advance wheel 24 cannot alter the position of the light lock door 14. However, the shaft 86 of the advancing means remains engaged with the internal spool of film cassette 12 such that rotation of the advancing means will rotate the internal spool, and further rotation of the advance wheel 24 in a clockwise direction will drive film out of the cassette 12. Retraction of lever 62 also pulls the sensor 38 toward the front of the camera, and out of the film path 54, as shown by the arrow inside the sensor 38 depicted in FIG. 6.

A film loading operation, and the attendant operation of the actuating mechanism 58, the sensor 38, the advancing means 56 and the light lock door driver 18, are explained below in further detail with reference to FIGS. 4–7. With the main body 32 securely assembled to the back cover 34 of the camera 10, a film cassette 12 is inserted into the film compartment 48 via a film cassette loading port 36 in the bottom in the camera (see FIGS. 1, 9 and 13) so that the shafts 74 and 86 engage their respective counterparts inside the film cassette 12. A tab or door 96 is securely mounted to light tightedly cover the film cassette loading port 36. Lever 62 and driver 18 will be oriented as shown in FIG. 4, i.e., the lever 62 will not be retracted, the coupling gear 64 will be engaged with the driver 18, and the sensor 38 will project into the film path 54. Clockwise rotation of the advance wheel 24 will open the light lock door 14, as above described. FIG. 5 illustrates the orientation of these elements at this juncture. Further rotation of the advance wheel 24 is inhibited by a stop 78, as described below.

Next, the lever 62 is retracted either manually or with the aid of a fixture (not shown). This de-couples the coupling gear 64 from the driver 18, thus freeing advance wheel 24 to again rotate clockwise. This is shown in FIG. 6. Retraction of the lever 62 also pulls the sensor 38 in toward the front of the camera 10 (i.e., in the direction shown by the arrow inside sensor 38 in FIG. 6), so that the sensor 38 is disposed out of the film path 54. With the lever 62 retracted, the advance wheel 24 is further rotated clockwise to drive film 16 out of cassette 12 and into the film path 54. The spool 44 has been previously rotated so that the film receiving slot 44 is aligned with the path of travel of the film 16 along the film path 54. As the advance wheel 24 is continued to be rotated clockwise to drive the film, a leading edge 42 of the film 16 is received into the slot 44, as also shown in FIG. 6. The film installed may look into the opening 100 to ensure the leading edge 42 has been received into the slot 44 before proceeding further. At this juncture, the lever 62 may be released. The spring 60 biases the lever 62 toward its non-retracted position (i.e., toward the back cover 34). However, as shown in FIG. 6, the sensor 38 contacts the film 16, thus preventing the lever 62 from fully returning to its original position, and thus keeping the driver 18 de-coupled from the coupling gear 64. Hence, the light lock door 14 will still not be operated by rotation of advance wheel 24.

Film is withdrawn from the cassette 12 and pre-wound onto the spool 26 by means of an external driver 40 that is adapted to engage the interior peripheral surface of spool 26. See FIGS. 7 and 9. Driver 40 is rotated so as to rotate spool 26 via an access opening 100 in the bottom of the camera until pre-winding has been completed. At this juncture, the driver 40 is removed, and unless a battery is to be inserted into the camera 10 (as discussed more fully below), a door or tab 82 is secured in place to light tightedly cover the opening 100. As discussed more fully hereinafter, the spool 26 is mounted rotatedly within the main body 32 in a light tight manner such that the only meaningful light path into the camera exists via the slot 44, and this exists only until film has been wound onto spool 26. The camera 10 is now ready to take exposures.

As exposures are taken, film is rewound from the spool 26 back to the film cassette 12, one frame at a time, by counterclockwise rotation of the advancing means 56. After the last frame has been exposed, continued counterclockwise rotation of the advance wheel pulls the leading edge 42 of the film 16 from the slot 44, and across the sensor 38. At this point, as is shown in FIG. 4, the sensor 38 is no longer restrained by the film 16. The bias exerted by the spring 60 urges the sensor 38 back into the film path 54, and the lever 62 biases back to its original position, i.e., towards the back cover, causing the coupling gear 64 to re-couple with the driver 18. Further counter-clockwise rotation of the advance wheel 24 thus rotates driver 18 in a counter-clockwise direction, thus closing the light lock door 14.

Preferably, the driver 18 cooperates with a pair of stops, an opening stop 78 and a closing stop 80, as shown in FIGS. 4 and 5. When the driver 18 is rotated clockwise, as shown by the arrow in FIG. 5, the teeth 84 of the driver 18 are driven against the opening stop 78, thus preventing further rotation of the driver 18, and preventing damage to the light lock door actuator inside the film cassette 12. Likewise, when the driver 18 has been rotated counter-clockwise, the teeth 84 of the driver 18 are driven against the closing stop 78, again preventing further rotation of the driver 18. See FIG. 4. When the driver 18 is prevented from rotating by the stops 78, 80, the advance wheel 24 is also prevented from rotating, unless it has been disengaged from the driver 18 as described above. Since the advance wheel 24 cannot be rotated once the driver 18 reaches the closing stop 80, the closing stop 80 also functions to inform the camera user when all of the film 16 has been rewound into the film cassette 12.

As illustrated in FIG. 8, the camera may also include a claw preventer 94 mounted to the front cover 15 of the main body 32 and cooperating with the advance wheel 24. The claw preventer 94 prevents rotation of the advance wheel 24 in a clockwise direction, i.e., the direction that drives film 16 out of the film cassette 12. The claw preventer 94 does permit counter-clockwise rotation of the advance wheel 24, i.e., in the direction that rewinds film 16 back into the film cassette 12.

During the initial phases of the film loading process described above, the front cover 15 is not assembled to the inner body 17. Consequently, the claw preventer 94 attached to the front cover 15 is not engaged with the film advance wheel 24 mounted on the inner body 17. Hence, the claw preventer 94 does not prevent the above described clockwise rotation of the advance wheel 24. After film 16 has been pre-wound onto the film spool 26, the front cover 15 is affixed to the inner body 17 and the claw preventer 94 is permitted to engage the advance wheel 24 as shown in FIG. 8. It should be noted that the film path 54 is not exposed when front cover 15 is removed.

Figure 10:
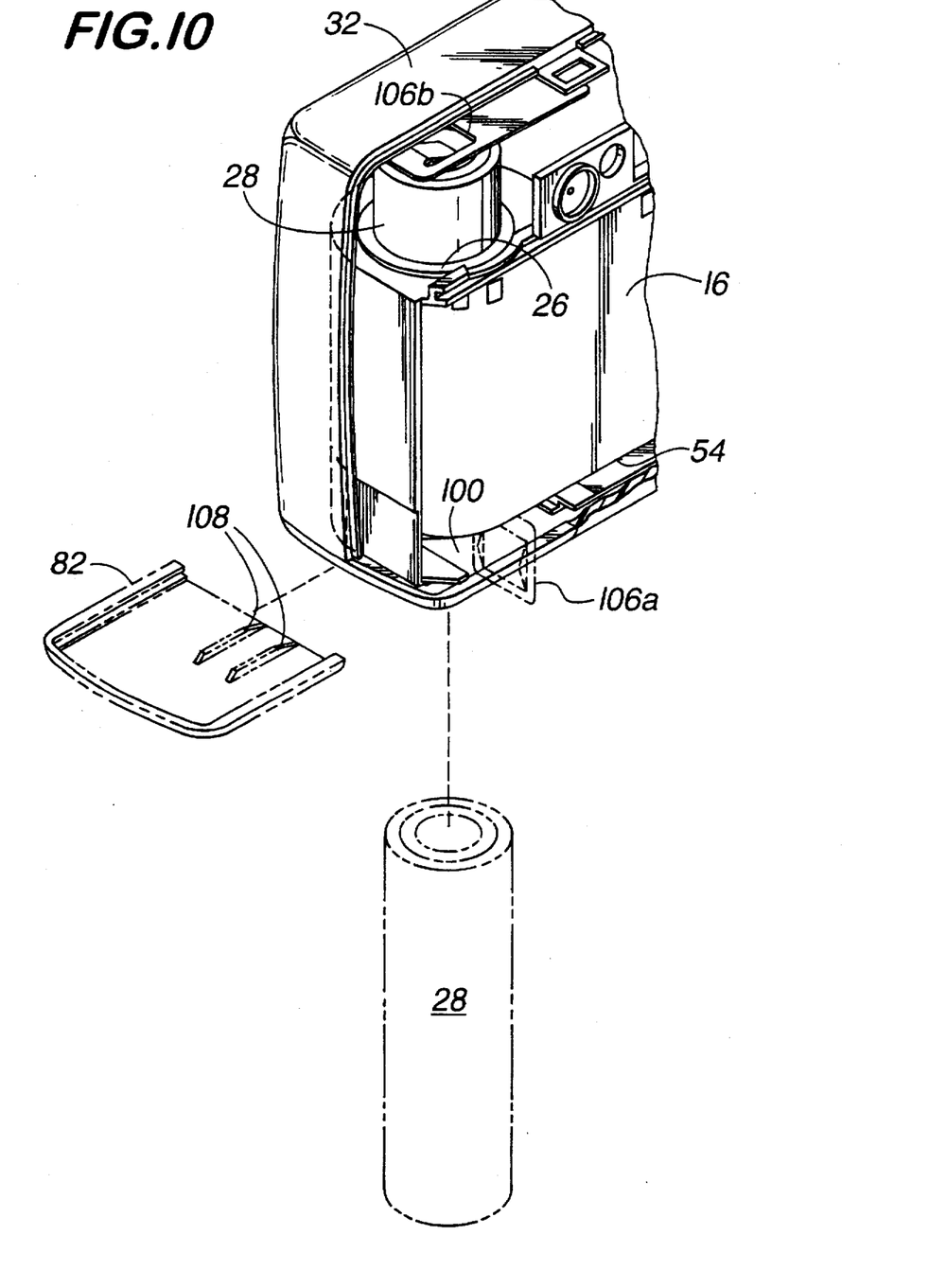
FIG. 10 is an isometric view illustrating the manner in which a battery is loaded into the camera of FIG. 1.

The camera 10 may also include a battery 28, for example, if the camera has a flash unit. Preferably, as more fully described in the above referenced pending application entitled "Camera With Battery Located Inside of the Film Spool", a battery compartment is defined inside the film spool 26. A pair of electrical contacts 106a and 106b are disposed adjacent opposite ends of the spool and are arranged to make contact with the battery terminals of, e.g., a size AA battery. Contact 106a is preferably flexibly mounted to the main body 32 as shown in FIG. 10 to facilitate battery loading. In particular, after the film has been pre-wound on the spool 26 as above described, the battery 28 may be inserted into a hollow core 30 of the spool, and the contact 106a may be bent there over. A tab 82 with raised portions 108 light tightedly closes the opening into which the battery, and the raised portions 108 urge the upper terminal of the battery against contact 106b while urging the contact 106a against the lower terminal of the battery. See FIGS. 10 and 11.

Figure 11:
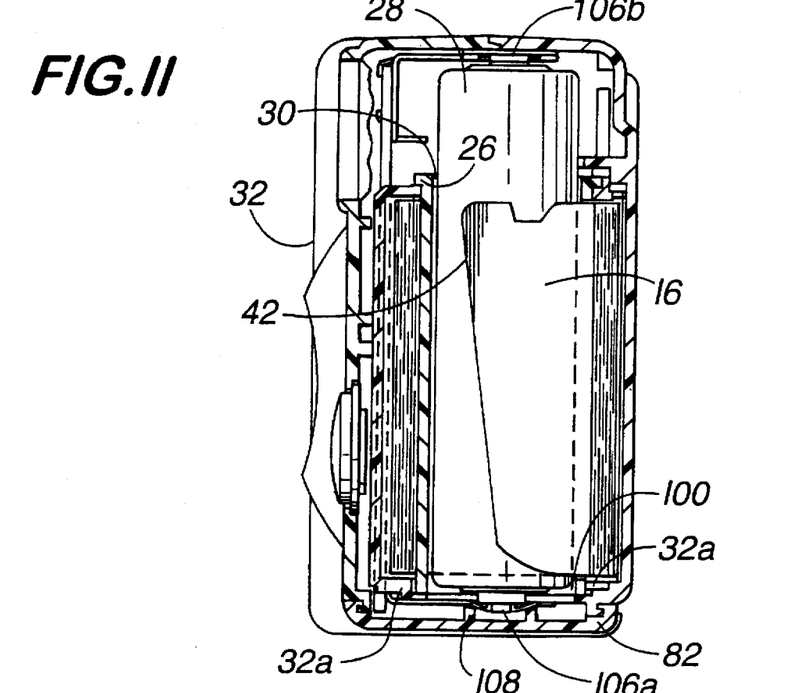
FIG. 11 is a cross section taken through line 11—11 of FIG. 1.

As best shown in FIG. 11, main body 32 has a portion 32a that light tightedly envelopes the spool 26, including the bottom periphery thereof. Thus, once the film cassette 12 has been inserted into the camera and the film cassette tab 96 has been placed on the film cassette loading port 36, and before the tab 82 has been placed over opening 100 below the spool in the bottom of the camera, the only path for meaningful amounts of light to enter the camera is via the opening 100 and slot 44. This path is illustrated by an arrow 55 in FIG. 4. However, once the leading edge 42 of the film has entered the slot 44 and the spool 26 has been rotated even slightly, this path is eliminated because, as seen in FIGS. 6 and 7, the film forming the leading edge 42 blocks that entry point. It has been found that the above described camera design also prevents any substantial amount of light from traveling far enough along the film path 54 to expose film in the cassette 12 when the light lock door 14 has been opened. It will be appreciated that this is a substantial feature of the invention, since, in the above described practice of the invention, there is a period of time between the time that the light lock door 14 is first opened and the time that the film edge 42 finally blocks the slot 44. If any substantial amount of light were permitted to travel far enough along the film path during this interval, then the film inside the cassette could be exposed. In the practice of the invention, however, only a leader portion of the film, i.e., the portion that is first withdrawn from the cassette 12 to the slot 44, can be exposed.

Figure 14:
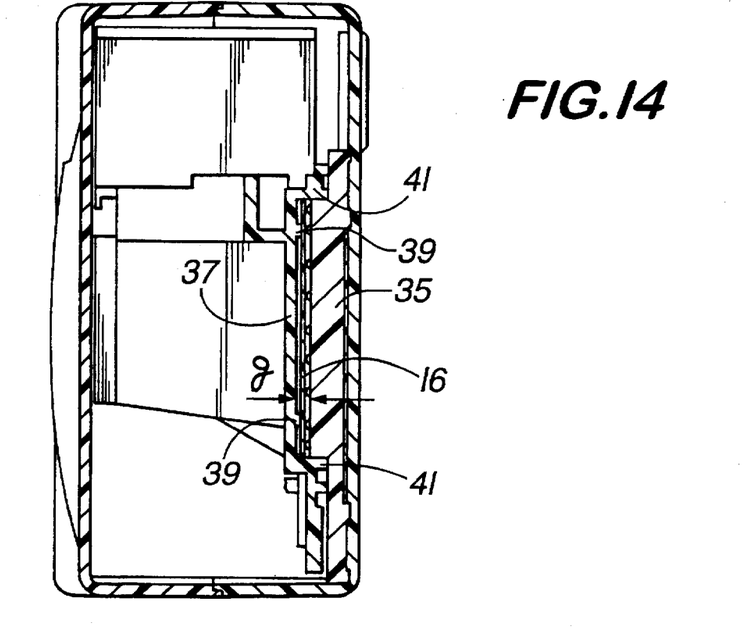
FIG. 14 is a cross section taken through line 14—14 of FIG. 13.

As shown in FIG. 14, the back cover 34 has a pressure plate 35 that extends toward the front of the camera 10. The main body 32 has a recessed portion 37 that extends toward the back cover 34 of the camera 10, film guides 39 that guide the film 16 through a portion of the film path 54 and film rails 41 that the film 16 rests between in a portion of the film path 54. There is a gap g formed between the pressure plate 35 and the recessed portion 37, defining that part of the film path 54 near the center of the camera 10.

Using a standard APS film cassette, experiments were carried with one embodiment of a camera 10 having the following characteristics, and in an illuminated room having the following light level, and no film in the cassette was found to be exposed:

| | |
|---|---|
| Film thickness: | 0.1 mm. |
| Width $w_1$ of slot 44 at inner periphery of spool 44 (see FIG. 5): | 1.0 mm. |
| Width $w_2$ of slot 44 at outer periphery of spool 26 (see FIG. 5): | 2.0 mm. |
| Length $l_1$ of slot 44 (see FIG. 11): | 46 mm. |
| Length $l_2$ of film path 54 (see FIG. 8): | 54 mm. |
| Width of gap g (see FIG. 14): | 0.5–0.6 mm. |
| Light level in room (measured in light value (LV): | LV 6–LV 7 |

In an alternative film loading method, the driver 40 is inserted into the spool 26 in a light tight manner (i.e., to prevent light from entering the interior of spool 26) before the light lock door 14 is opened. Then the light lock door 14 is opened, and the leading edge 42 of film 16 is advanced into the slot 44, as above described. Next, the driver 40 is rotated, as also above described. This prevents any light from entering the film path 54 anytime during a film loading procedure. Thus, according to this embodiment of the film loading method, light entering the camera to expose film is not a concern because, when the driver is removed, spool 26 will have been pre-wound and no light can enter via slot 44 at any time.

Preferably, the camera 10 is a plastic single use camera, as described in the background section above. Thus, in a preferred embodiment, the main body 32 and back cover 34 are secured together by locking means, screws, adhesive, thermal bonding etc. prior to the above described film loading process. As is typical, and as depicted by the dashed lines 110 in FIGS. 12 and 13, packaging, such as adhesive backed paper, cardboard or even plastic, preferably surrounds at least portions of the camera 10. As is common, this packaging contains indicia that points out various parts of the camera (shutter, flash charge button, etc.) and/or instructions for use. As is also common, it is preferred that this packaging must be removed and destroyed, at least in part, to remove the film cassette 12 from the camera. Although it is known that these cameras may be recycled, reloading film therein usually requires removal of the back cover 34, and hence destruction of at least a portion of the packaging or even, in some cases, destruction of at least a portion of the camera body.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. In a camera of the type that employs a film cassette having a light lock door that is movable between open and closed positions, the camera having a main body, a back cover securely attached thereto, a film cassette compartment on one end, a rotatable spool with a film receiving slot on the other end, a film path extending between the film cassette compartment and the spool, a film cassette loading port for loading the film cassette into the film cassette compartment, rotatable advancing means for advancing film between the film cassette and the spool, a method comprising the steps of:

i) loading the film cassette into the film cassette compartment via the film loading port with the light lock door closed, the advancing means engaging a light lock door actuator inside the film cassette;

ii) rotating the advancing means in a first direction to open the light lock door;

iii) preventing further rotation of the advancing means from operating the light lock door actuator;

iv) continuing to rotate the advancing means in the first direction to drive film out of the cassette, across the film path and into the film receiving slot;

v) winding film from the cassette onto the spool;

whereby the camera is pre-loaded with the back cover, in place the camera being adapted to take exposures, one frame at a time, by rotating the advancing means in a second direction opposite to the first direction to withdraw film back into the cassette.

2. Method according to claim 1 wherein each of said steps occurs in non-darkroom conditions.

3. Method according to claim 1 further comprising the steps of:

i) rotating the advancing means in the second direction to withdraw film back into the cassette;

ii) permitting the advancing means to operate the light lock door actuator after all of the film has been withdrawn into the cassette;

iii) continuing to rotate the advancing means in the second direction to close the light lock door.

4. Method according to claim 1 further comprising the step of packaging the camera such that the film cassette cannot be removed without destroying at least one of part of said packaging, part of said back cover, or part of said main body.

5. Method according to claim 1 further comprising the step of packaging the camera such that the camera cannot be re-loaded with fresh film without destroying at least one of part of said packaging, part of said back cover, or part of said main body.

6. Method according to claim 1 further comprising the step of preventing the advancing means from rotating in the first direction after the camera has been pre-loaded.

7. Method according to claim 1 further comprising the step of inserting a battery inside the spool after step (v) has been completed.

8. Method according to claim 1 wherein the advancing means comprises a thumb wheel and each step of rotation comprises manually rotating the thumb wheel.

9. Method according to claim 1 wherein a light path exists into the film path via the slot prior to completing step (iv), the method further comprising the step blocking the light path by inserting the film into the slot.

* * * * *